United States Patent
Chen

(10) Patent No.: US 12,022,149 B2
(45) Date of Patent: Jun. 25, 2024

(54) METHOD FOR PROCESSING SOUND INFORMATION, AND NON-TRANSITORY COMPUTER STORAGE MEDIUM AND ELECTRONIC DEVICE

(71) Applicant: Guangzhou Boguan Telecommunication Technology Co., Ltd., Guangdong (CN)

(72) Inventor: Zeyu Chen, Guangdong (CN)

(73) Assignee: Guangzhou Boguan Telecommunication Technology Co., Ltd., Guangdong (CN)

( * ) Notice: Subject to any disclaimer, the term of this patent is extended or adjusted under 35 U.S.C. 154(b) by 0 days.

(21) Appl. No.: 18/246,686

(22) PCT Filed: Dec. 2, 2021

(86) PCT No.: PCT/CN2021/135175
§ 371 (c)(1),
(2) Date: Mar. 27, 2023

(87) PCT Pub. No.: WO2022/121778
PCT Pub. Date: Jun. 16, 2022

(65) Prior Publication Data
US 2023/0370672 A1    Nov. 16, 2023

(30) Foreign Application Priority Data
Dec. 8, 2020 (CN) .......................... 202011442860.2

(51) Int. Cl.
*H04N 21/431* (2011.01)
*H04N 21/439* (2011.01)
(Continued)

(52) U.S. Cl.
CPC ..... *H04N 21/4312* (2013.01); *H04N 21/4398* (2013.01); *H04N 21/44218* (2013.01); *H04S 7/303* (2013.01)

(58) Field of Classification Search
CPC ........... H04N 21/4312; H04N 21/4398; H04N 21/44218; H04N 21/4508; H04S 7/303; H04S 1/007; G06F 3/165; G06F 3/04847
See application file for complete search history.

(56) References Cited

U.S. PATENT DOCUMENTS

| 5,894,320 A | * | 4/1999 | Vancelette ........... H04N 21/482 725/138 |
| 7,526,790 B1 | * | 4/2009 | Vesikivi .................. H04S 7/302 725/135 |

(Continued)

FOREIGN PATENT DOCUMENTS

| CN | 1703065 A | 11/2005 |
| CN | 201294599 Y | 8/2009 |

(Continued)

OTHER PUBLICATIONS

1st Office Action dated May 20, 2021 of Chinese Application No. 202011442860.2.

(Continued)

*Primary Examiner* — Oschta I Montoya
(74) *Attorney, Agent, or Firm* — Qinghong Xu

(57) ABSTRACT

A method for processing sound information, the method including: obtaining, by a terminal with a graphical user interface, viewer position information of a viewer identifier in the graphical user interface and broadcaster position information of a broadcaster identifier in the graphical user interface; determining, by the terminal, orientation information of the broadcaster identifier relative to the viewer identifier according to the viewer position information and the broadcaster position information; and obtaining, by the (Continued)

terminal, broadcaster sound information corresponding to the broadcaster identifier, and obtaining stereo sound information by converting the broadcaster sound information based on the orientation information.

18 Claims, 13 Drawing Sheets

(51) Int. Cl.
*H04N 21/442* (2011.01)
*H04S 7/00* (2006.01)

(56) References Cited

U.S. PATENT DOCUMENTS

| | | | | |
|---|---|---|---|---|
| 9,973,874 | B2* | 5/2018 | Stein | G10L 19/167 |
| 2007/0263823 | A1 | 11/2007 | Jalava et al. | |
| 2013/0120371 | A1 | 5/2013 | Petit | |
| 2016/0100253 | A1* | 4/2016 | Yliaho | H04R 5/02 |
| | | | | 381/306 |
| 2021/0029480 | A1* | 1/2021 | Mate | G10L 19/008 |

FOREIGN PATENT DOCUMENTS

| | | |
|---|---|---|
| CN | 103347199 A | 10/2013 |
| CN | 105325014 A | 2/2016 |
| CN | 107211062 A | 9/2017 |
| CN | 107211180 A | 9/2017 |
| CN | 110121695 A | 8/2019 |
| CN | 111095191 A | 5/2020 |
| CN | 111886880 A | 11/2020 |
| CN | 112601170 A | 4/2021 |
| CN | 112601170 B | 9/2021 |
| CN | 113490136 A | 10/2021 |

OTHER PUBLICATIONS

International Search Report dated Jan. 29, 2022 of International Application No. PCT/CN2021/135175.
1st Office Action dated Mar. 23, 2022 of Chinese Application No. 202110817398.8.
2nd Office Action dated Jun. 23, 2022 of Chinese Application No. 202110817398.8.

* cited by examiner

METHOD FOR PROCESSING SOUND INFORMATION, AND NON-TRANSITORY COMPUTER STORAGE MEDIUM AND ELECTRONIC DEVICE

CROSS REFERENCE TO RELATED APPLICATIONS

The present application is a National Stage application of International Application No. PCT/CN2021/135175, filed on Dec. 2, 2021, which claims priority to Chinese Patent Application No. 202011442860.2, entitled "Method and apparatus for processing Sound Information, computer storage medium, and electronic device," filed on Dec. 8, 2020, the entire contents of both of which are incorporated herein by reference for all purposes.

TECHNICAL FIELD

The present disclosure relates to the technical field of the Internet technology, and particularly, to a method for processing sound information, an apparatus for processing sound information, a computer-readable storage medium, and an electronic device.

BACKGROUND

With the development of Internet technology, network live broadcast becomes a new way of obtaining information and entertainment. Moreover, with the increase of network live broadcast users, the manner of network live broadcast is changed in various forms. A common network live broadcast manner has video live broadcast and voice live broadcast. Where, the voice live broadcast is a pure audio live broadcast manner, and the user obtains information by listening to the broadcaster sound to achieve the effect of entertainment.

It should be noted that the information disclosed in the above background is used to enhance the understanding of the background of the present disclosure, and therefore may include information that does not constitute related technologies known to those of ordinary skill in the art.

SUMMARY

According to a first aspect of the present disclosure, a method for processing sound information is provided. The method is applied to a terminal including a graphical user interface, where the method includes: obtaining viewer position information of a viewer identifier in the graphical user interface, and obtaining broadcaster position information of a broadcaster identifier in the graphical user interface; determining orientation information of the broadcaster identifier relative to the viewer identifier according to the viewer position information and the broadcaster position information; and obtaining broadcaster sound information corresponding to the broadcaster identifier, and obtaining stereo sound information by converting the broadcaster sound information using the orientation information.

According to a second aspect of the present disclosure, an electronic device is provided, the electronic device including: a processor and a memory, where a computer readable instruction is stored on the memory, and when the computer readable instruction is executed by the processor, the method for processing sound information as disclosed in the first aspect of the present disclosure is implemented.

According to a third aspect of the present disclosure, there is provided a non-transitory computer-readable storage medium, having stored thereon instruction that, when executed by a processor of an electronic device, cause the electronic device to perform operations of the methods as disclosed in the first aspect of the present disclosure.

BRIEF DESCRIPTION OF THE DRAWINGS

The accompanying drawings, which are incorporated in and constitute a part of this description, illustrate examples consistent with the present disclosure and, together with the description, serve to explain the principles of the disclosure.

DETAILED DESCRIPTION

Figure 1:
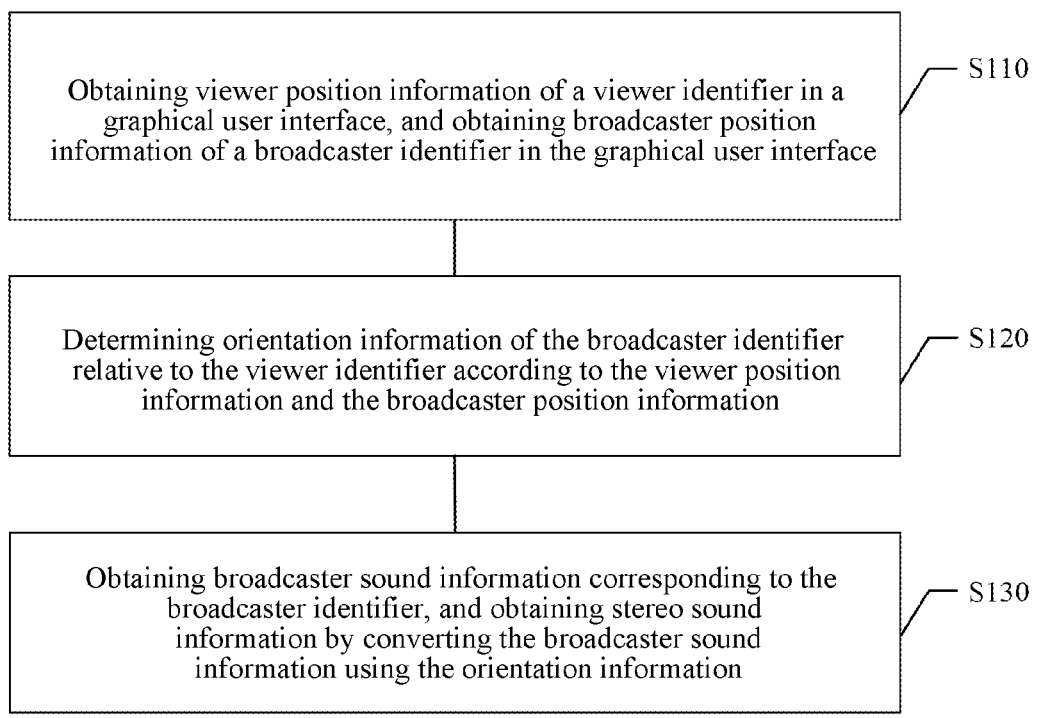
FIG. 1 shows a schematic flowchart of a method for processing sound information according to an embodiment of the present disclosure.

Reference will now be described in detail to examples, which are illustrated in the accompanying drawings. The following description refers to the accompanying drawings in which the same numbers in different drawings represent the same or similar elements unless otherwise represented.

The examples described following do not represent all examples consistent with the present disclosure. Instead, they are merely examples of devices and methods consistent with aspects of the disclosure as detailed in the appended claims.

The terms "a", "an", "the" and "said" in the description are used to indicate that there are one or more elements/components/etc. The terms "comprising" and "including" are used to indicate open inclusion and mean that there may be other elements/components/etc. besides the listed elements/components/etc. The terms "first" and "second" are used as labels, and are not limited to the number of the objects.

Reference throughout this description to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

In addition, the drawings are schematic illustrations of the present disclosure, and are not necessarily drawn to scale. Same reference numerals in the drawings denote the same or similar parts, and thus repeated descriptions of them will be omitted. Some block diagrams shown in the accompanying drawings are functional entities, and do not necessarily correspond to physical or logically independent entities.

In the related art, the broadcaster sound listened to by the user does not have a stereo impression. However, in nature, the obtained sound is a sound having a stereo impression. Obviously, the sound effect perceived by the user is far away from the sound effect in the nature and cannot bring reality experience to the user, thus reducing the user experience.

In view of this, there is an urgent need in the art to develop a new method and apparatus for processing sound information.

The present disclosure provides a method for processing sound information. FIG. 1 shows a schematic flowchart of a method for processing sound information, applied to a terminal including a graphical user interface, as shown in FIG. 1, the method for processing sound information includes the following steps:

In step S110, viewer position information of a viewer identifier in the graphical user interface is obtained, and broadcaster position information of a broadcaster identifier in the graphical user interface is obtained.

In step S120, orientation information of the broadcaster identifier relative to the viewer identifier is determined according to the viewer position information and the broadcaster position information.

In step S130, broadcaster sound information corresponding to the broadcaster identifier is obtained, and stereo sound information is obtained by converting the broadcaster sound information using the orientation information.

In the method and apparatus provided in the embodiments of the present disclosure, on one hand, the orientation information of the broadcaster position information relative to the viewer position information is determined on the terminal including a graphical user interface, and the broadcaster sound information is converted into the stereo sound information according to the orientation information, so that the sound has a stereo impression, the reality experience of the user is enhanced, and the user experience is improved. On the other hand, by responding to a second trigger operation and a third trigger operation, the stereo effect of the sound can be flexibly changed, the application scenarios of sound information processing are enriched, and the interestingness of using the method for processing sound information is increased.

The following describes various steps of the method for processing sound information in detail.

In step S110, viewer position information of a viewer identifier in the graphical user interface is obtained, and broadcaster position information of a broadcaster identifier in the graphical user interface is obtained.

In some embodiments of the present disclosure, the graphical user interface refers to a computer-operated user interface displayed in a graphical manner.

In the graphical user interface, a user is allowed to manipulate icons or menu options, commands, call files, boot programs, and other daily tasks on the screen using input devices such as a mouse.

The graphical user interface may be a graphical user interface on a computer terminal, or may be a graphical user interface on a mobile phone terminal, or may be a graphical user interface on a tablet computer terminal, or may be a graphical user interface on a terminal having a folding screen, which is not specifically limited in the embodiments.

In addition, the graphical user interface may be a graphical user interface of the broadcaster end, or may be a graphical user interface of the viewer end, or may be a graphical user interface of the host end that maintains the order of the live broadcast room, which is not specifically limited in the embodiments.

The viewer identifier refers to an identifier that may uniquely represent a viewer. The viewer identifier may be an avatar of the viewer, or may be a nickname of the viewer, or may be an identity identification number of the viewer, which is not specifically limited in the embodiments.

The broadcaster identifier refers to an identifier that may uniquely represent a broadcaster. The broadcaster identifier may be an avatar of the broadcaster, or may be a nickname of the broadcaster, or may be a broadcaster identity identification number of the broadcaster, which is not specifically limited in the embodiments.

The viewer position refers to a display position of the viewer identifier in the graphical user interface.

Specifically, the viewer position includes the abscissa of the position of the viewer on the graphical user interface and the ordinate of the position of the viewer on the graphical user interface. Moreover, the viewer position may be a position relative to the lower left corner of the graphical user interface, or may be a position relative to the lower right corner of the graphical user interface, or may be a position relative to an upper left corner of the graphical user interface, or may be a position relative to an upper right corner of the graphical user interface, or may be a position relative to any point in the graphical user interface, which is not specifically limited in the embodiments.

The broadcaster position refers to a display position of the broadcaster identifier in the graphical user interface.

Specifically, the broadcaster position includes the abscissa of the position of the broadcaster on the graphical user interface and the ordinate of the position of the broadcaster on the graphical user interface. Moreover, the broadcaster position may be a position relative to the lower left corner of the graphical user interface, or may be a position relative to the lower right corner of the graphical user interface, or may be a position relative to an upper left corner of the graphical user interface, or may be a position relative to an upper right corner of the graphical user interface, and may also be a position relative to any point in the graphical user interface, which is not specifically limited in the embodiments.

It should be noted that the broadcaster position information and the user position information must be position information relative to the same point in the user interface.

For example, when a user uses a mobile phone to enter a certain voice live broadcast room, the graphical user interface refers to a live broadcast interface displayed in a mobile phone display screen. The viewer identifier refers to the viewer avatar representing the viewer, and the broadcaster identifier refers to the broadcaster avatar representing the broadcaster.

The viewer position information refers to the position information used to display the viewer avatar relative to the lower left corner of the live broadcast interface. The broadcaster position information refers to the position information used to display the broadcaster avatar relative to the lower left corner of the live broadcast interface.

Figure 2:
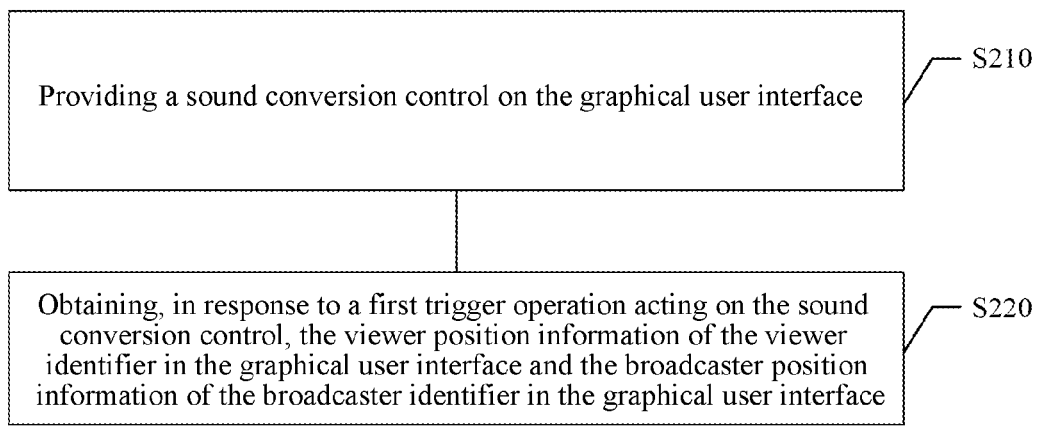
FIG. 2 shows a schematic flowchart of obtaining viewer position information and broadcaster position information in a graphical user interface according to an embodiment of the present disclosure.

FIG. 2 shows a schematic flowchart of obtaining viewer position information and broadcaster position information in a graphical user interface. As shown in FIG. 2, the method may include the following steps: in step S210, a sound conversion control is provided on the graphical user interface.

A control refers to a graph on the graphical user interface that may be triggered.

The control may be triggered by the user, or may be triggered by the viewer, or may be triggered by a host that maintains the order of the live broadcast room, which is not specifically limited in the embodiments.

A sound conversion control refers to a graph on the graphical user interface that identifies the sound conversion information. Among them, the sound conversion information refers to information that can help the user to identify the sound conversion control.

The sound conversion control may be a square control, or may be a rectangular control, or may be a circular control, or may be a polygon control, which is not specifically limited in the embodiments.

In addition, the sound conversion information may be text information, or may be graphic information, which is not specifically limited in the embodiments.

For example, when a user uses a mobile phone to enter a certain voice live broadcast room, the sound conversion control may be a rectangular graph at the lower right corner of the live broadcast interface. The words "sound on" are displayed on this graph, and "sound on" is the information to help the user to identify the sound conversion control.

In step S220, in response to a first trigger operation acting on the sound conversion control, viewer position information of the viewer identifier in the graphical user interface and broadcaster position information of the broadcaster identifier in the graphical user interface are obtained.

The first trigger operation refers to an operation acting on the sound conversion control in the graphical user interface.

The first trigger operation may be a click operation performed by a user with a hand, or may be a long-press operation performed by the user with a hand, or may be a double-click operation performed by the user with a hand, which is not specifically limited in the embodiments.

In addition, the first trigger operation may be an operation performed by a user using a certain trigger medium, and may be an operation performed by means of a mouse, or may be an operation performed by means of a stylus, which is not specifically limited in the embodiments.

For example, after the user enters the voice live broadcast room and clicks the sound conversion control at the lower left corner of the live broadcast interface, the sound conversion function is started, and at this time, the viewer position information and the broadcaster position information may be changed. The display position of the viewer avatar obtained after the change is the viewer position information, and the obtained display position of the broadcaster avatar is the broadcaster position information.

In the embodiments, on one hand, after entering the live broadcast room, the broadcaster position information and the viewer position information can be directly obtained, so that the user can directly listen to the stereo sound information sent by the broadcaster after entering the live broadcast room. On the other hand, the broadcaster position information and the viewer position information can be obtained by starting the sound conversion function in response to the trigger operation on the sound conversion control, so that the user converts the broadcaster sound information into the stereo sound information according to own requirements, the flexibility of the method for processing sound information is improved, and the use scenario of the method for processing sound information is expanded.

In step S120, orientation information of the broadcaster identifier relative to the viewer identifier is determined according to the viewer position information and the broadcaster position information.

In some embodiments of the present disclosure, the orientation information refers to orientation information of the broadcaster identifier relative to the viewer identifier.

For example, after the user enters a certain voice live broadcast room, the viewer position information may be a two-dimensional coordinate, for example, (50, 50), and the broadcaster position information of the broadcaster A may be (60, 70).

It is determined that the abscissa information corresponding to the viewer position information is 50, and the ordinate information corresponding to the viewer position information is 50. It is determined that the broadcaster abscissa corresponding to the broadcaster position information of the broadcaster A is 60, and the broadcaster ordinate corresponding to the broadcaster position information of the broadcaster A is 70.

Comparing the broadcaster abscissa 60 with the viewer abscissa 50, a comparison result that the broadcaster abscissa is greater than the viewer abscissa is obtained. Comparing the broadcaster ordinate 70 with the viewer ordinate 50, a comparison result that the broadcaster ordinate is greater than the viewer ordinate is obtain. Based on this, it can be determined that the viewer avatar is from an upper right side of the broadcaster avatar. At this time, the upper right side is the orientation information of the broadcaster avatar relative to the viewer avatar.

In addition, the orientation information may also be represented in the form of a direct south side, a direct north side, a direct west side, and a direct east side, and may also be represented in the form of a southeast side, a northeast side, a northwest side, and a southwest side, and may also be represented in the form of 30° east by north, 10° east by south, 15° west by north and 20° west by south, which is not specifically explained in the embodiments.

Figure 3:
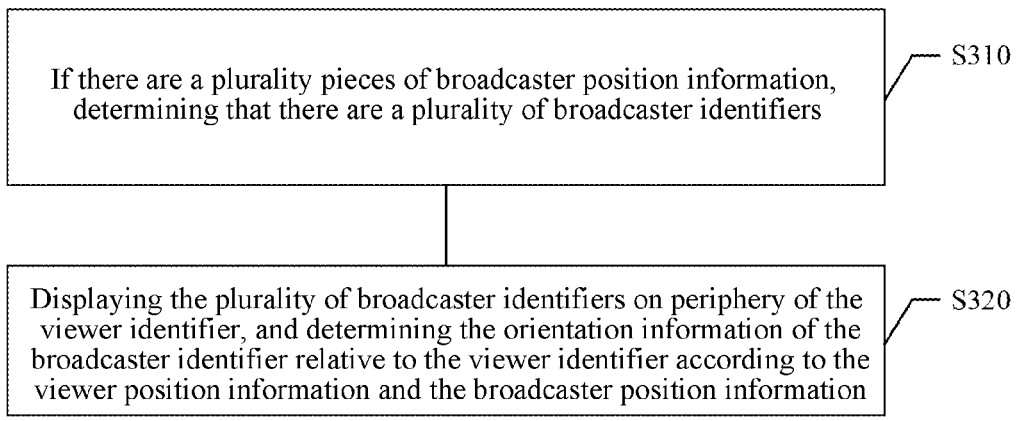
FIG. 3 shows a schematic flowchart of determining orientation information of more than one piece of broadcaster position information relative to viewer position information in an embodiment of the present disclosure.

FIG. 3 shows a schematic flowchart of determining orientation information of more than one piece of broadcaster position information relative to viewer position information. As shown in FIG. 3, the method may also include the following steps: in step S310, if there is more than one piece of broadcaster position information, it is determined that there is more than one broadcaster identifier.

If the obtained broadcaster position information is more than one piece of broadcaster position information, the corresponding broadcaster identifier information also has more than one piece.

For example, after a user enters a certain voice live broadcast room, four pieces of broadcaster position information is obtained, and four broadcaster avatars are correspondingly displayed on the four pieces of broadcaster position information.

In step S320, the more than one broadcaster identifier is displayed on the periphery of the viewer identifier, and orientation information of the broadcaster identifier relative to the viewer identifier is determined according to the viewer position information and the broadcaster position information.

Where, the periphery is relative, and a center exists when the periphery exists.

Therefore, if the display position of the viewer identifier is the center, any position on the graphical user interface other than the display position of the viewer identifier may be regarded as the periphery relative to the viewer identifier.

Based on this, the identifier in live broadcast may be displayed at any position on the graphical user interface other than the display position of the viewer identifier.

For example, after a viewer enters a certain voice live broadcast room, four pieces of broadcaster position information and user position information (50, 50) are obtained. The user may turn on the sound conversion function by triggering the sound conversion control. After the sound conversion function is turned on, four viewer avatars are determined, and four pieces of position information are determined as the display positions of the four broadcaster avatars by taking the viewer position information as the center and removing (50, 50) from the graphical user interface.

The orientation information of the four broadcaster avatars relative to the viewer avatar is determined according to the display positions of the four broadcaster avatars and the viewer position information.

Figure 4:
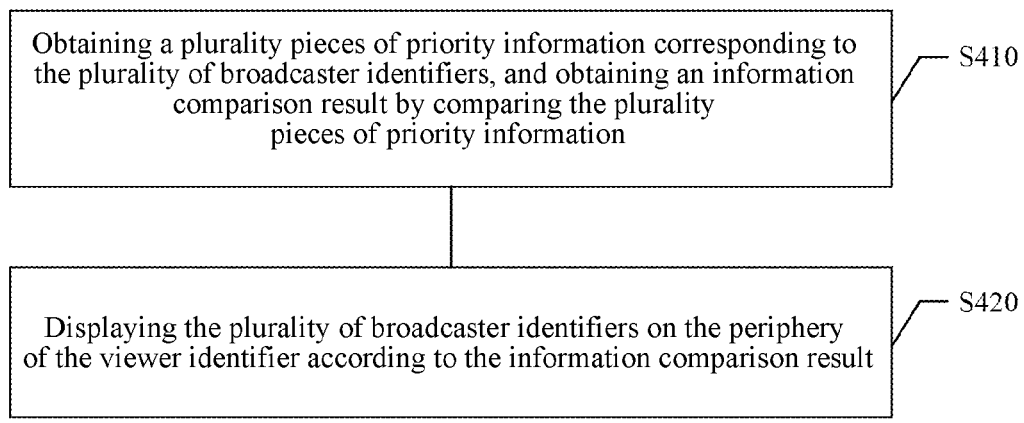
FIG. 4 shows a schematic flowchart of displaying more than one piece of broadcaster information on the periphery of a viewer identifier according to an embodiment of the present disclosure.

FIG. 4 shows a schematic flowchart of displaying more than one pieces of broadcaster information on the periphery of a viewer identifier. As shown in FIG. 4, the method may also include the following steps: in step S410, more than one piece of priority information corresponding to more than one broadcaster identifier is obtained, and an information comparison result is obtained by comparing the more than one piece of priority information.

Among them, the priority information refers to information having a corresponding relationship with the broadcaster avatar.

The priority information may be broadcaster level information of the broadcaster, or may be information of the historical number of viewers in the live broadcast room of the broadcaster, or may be information of the rewarding degree of the broadcaster, which is not specifically limited in the embodiments.

For example, a viewer enters a certain voice live broadcast room, and four broadcaster avatars exist in the voice live broadcast room. The corresponding broadcaster may be determined through the four broadcaster avatars, so as to obtain the broadcaster level information corresponding to the broadcaster.

Comparing the obtained four broadcaster level information A, B, C, and D, an information comparison result can be obtained.

In step S420, more than one broadcaster identifier is displayed on the periphery of the viewer identifier according to the information comparison result.

More than one broadcaster identifier is displayed on the periphery of the viewer identifier according to the information comparison result.

For example, the viewer enters a certain voice live broadcast room, the obtained information comparison result is that the broadcaster level information of the broadcaster A is greater than the broadcaster level information of the broadcaster B, the broadcaster level information of the broadcaster B is greater than the broadcaster level information of the D broadcaster D, and the broadcaster level information of the broadcaster D is greater than the broadcaster level information of the broadcaster C.

The broadcaster avatar of the broadcaster A, the broadcaster avatar of the broadcaster B, the broadcaster avatar of the broadcaster C, and the broadcaster avatar of the broadcaster D are displayed on the periphery of the viewer avatar according to the distance from the viewer avatar from near to far.

Figure 5:
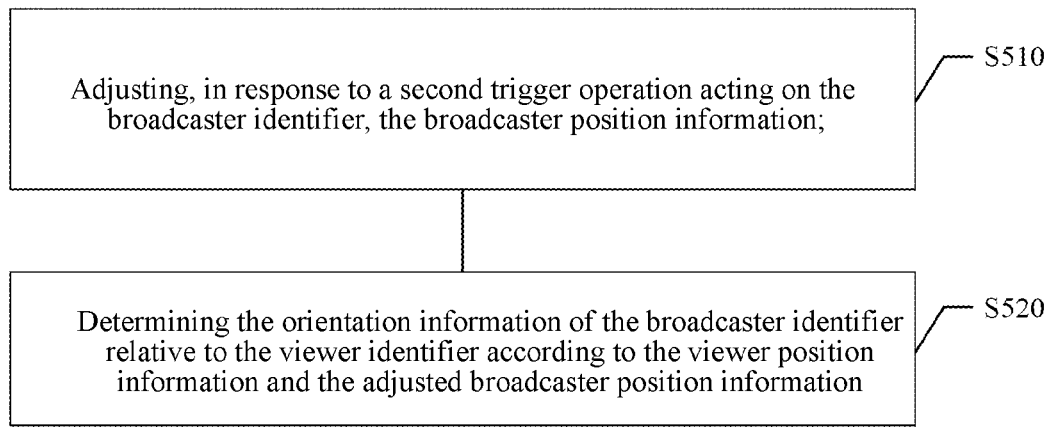
FIG. 5 shows a schematic flowchart of determining orientation information according to viewer position information and broadcaster position information in an embodiment of the present disclosure.

FIG. 5 shows a schematic flowchart of determining orientation information according to viewer position information and broadcaster position information. As shown in FIG. 5, the method may also include the following steps: in step S510, in response to a second trigger operation acting on a broadcaster identifier, the broadcaster position information is adjusted.

The second trigger operation refers to an operation for adjusting the broadcaster identifier in the graphical user interface.

The second trigger operation may be a sliding operation performed by a use with a hand, may be a click operation performed by the user with a hand, or may be a sliding operation performed by the broadcaster with a hand, or may be a click operation performed by the broadcaster with a hand, or may be a sliding operation performed by the host for maintaining the order of the live broadcast room with a hand, or may be a click operation performed by the host for maintaining the order of the live broadcast room with a hand, which is not specifically limited in the embodiments.

In addition, the second trigger operation may be an operation performed by means of a certain trigger medium, which may be a trigger operation performed by means of a mouse, or may be a trigger operation performed by means of a stylus, which is not specifically limited in the embodiments.

Moreover, the second trigger operation may be a trigger operation performed along a certain fixed trajectory, or may be a trigger operation performed not along a certain fixed trajectory, which is not specifically limited in the embodiments.

For example, the viewer enters a certain voice live broadcast room, there are three pieces of broadcaster position information on the periphery of the viewer position information. The broadcaster avatar of the broadcaster A, the broadcaster avatar of the broadcaster B, and the broadcaster avatar of the broadcaster C, are respectively displayed.

The viewer can adjust the broadcaster avatar of the broadcaster A from the broadcaster position information of broadcaster A to the broadcaster position information of broadcaster B by a sliding operation.

In step S520, the orientation information of the broadcaster identifier relative to the viewer identifier is determined according to the viewer position information and the adjusted broadcaster position information.

After the broadcaster position information is adjusted through the second trigger operation, the adjusted broadcaster position information needs to be obtained again, and the orientation information is determined according to the adjusted broadcaster position information and the viewer position information.

For example, the viewer enters a certain voice live broadcast room, there are three pieces of broadcaster position information on the periphery of the viewer position information. The broadcaster avatar of broadcaster A, the broadcaster avatar of broadcaster B, and the broadcaster avatar of broadcaster C, are respectively displayed.

The viewer can adjust the broadcaster avatar of broadcaster A from the broadcaster position information of broadcaster A to the broadcaster position information of broadcaster B by a sliding operation.

At this time, the orientation information of the broadcaster A relative to the viewer position information needs to be determined according to the adjusted broadcaster position information of broadcaster A and the viewer position information.

Figure 6:
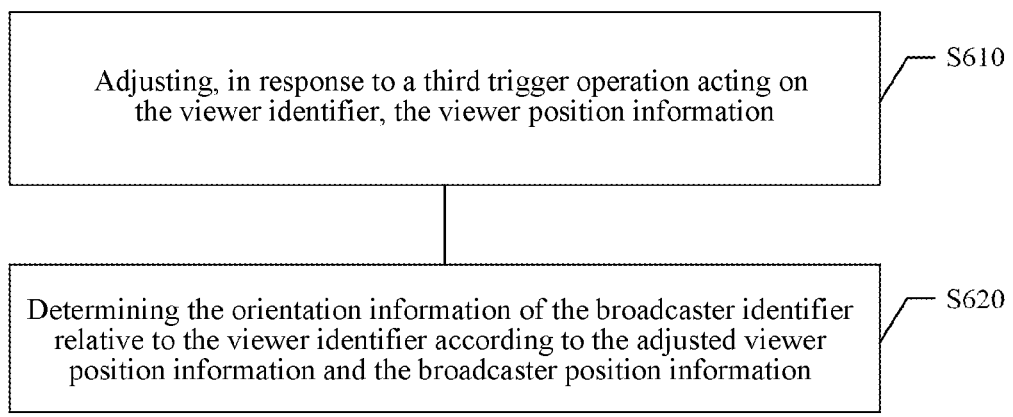
FIG. 6 shows a schematic flowchart of determining orientation information according to viewer position information and broadcaster position information in an embodiment of the present disclosure.

FIG. 6 shows a schematic flowchart of determining orientation information according to viewer position information and broadcaster position information. As shown in FIG. 6, the method may also include the following steps: in step S610, in response to a third trigger operation acting on a viewer identifier, viewer position information is adjusted.

The third trigger operation refers to an operation for adjusting the viewer identifier in the graphical user interface.

The third trigger operation may be a sliding operation performed by a user with a hand, may be a click operation performed by the user with a hand, or may be a sliding operation performed by the broadcaster with a hand, or may be a click operation performed by the broadcaster with a hand, or may be a sliding operation performed by the host for maintaining the order of the live broadcast room with a hand, or may be a click operation performed by the host for maintaining the order of the live broadcast room with a hand, which is not specifically limited in the embodiments.

In addition, the third trigger operation may be an operation performed by means of a certain trigger medium, which may be an operation performed by means of a mouse, or may be an operation performed by means of a stylus, which is not specifically limited in the embodiments.

Moreover, the third touch operation may be a trigger operation performed along a certain fixed trajectory, or may be a trigger operation performed not along a certain fixed trajectory, which is not specifically limited in the embodiments.

For example, the viewer enters a certain voice live broadcast room, there are three pieces of broadcaster position information in the periphery of the viewer position information. The broadcaster avatar of the broadcaster A, the broadcaster avatar of the broadcaster B, and the broadcaster avatar of the broadcaster C, are respectively displayed.

The viewer may adjust the viewer position information for a certain distance to the orientation of the broadcaster position information of the broadcaster A by a sliding operation.

In step S620, orientation information of the broadcaster identifier relative to the viewer identifier is determined according to the adjusted viewer position information and the broadcaster position information.

After the viewer position information is adjusted through the third trigger operation, the adjusted viewer position information needs to be obtained again, and the orientation information is determined according to the adjusted viewer position information and the broadcaster position information.

For example, the viewer enters a certain voice live broadcast room, there are three pieces of broadcaster position information on the periphery of the viewer position information. The broadcaster avatar of the broadcaster A, the broadcaster avatar of the broadcaster B, and the broadcaster avatar of the broadcaster C, are respectively displayed.

The viewer can move the viewer avatar for a certain distance closer to the position of the broadcaster avatar based on the orientation of the broadcaster avatar position information of the broadcaster A by a sliding operation, and the adjusted viewer position information is obtained.

At this time, the orientation information of the broadcaster avatar of broadcaster A relative to the viewer avatar needs to be determined according to the adjusted viewer position information and the broadcaster position information of the broadcaster A; the orientation information of the broadcaster avatar of the broadcaster B relative to the viewer avatar needs to be determined according to the adjusted viewer position information and the broadcaster position information of the broadcaster B; and the orientation information of the broadcaster avatar of the broadcaster C relative to the viewer avatar needs to be determined according to the adjusted viewer position information and the broadcaster position information.

In the embodiments of the present disclosure, the stereo effect of the broadcaster sound can be flexibly changed by responding to the second trigger operation or the third trigger operation, which enriches the application scenarios of the method for processing sound information, and increases the interestingness of using the method for processing sound information.

In step S130, broadcaster sound information corresponding to the broadcaster identifier is obtained, and stereo sound information is obtained by converting the broadcaster sound information using the orientation information.

In some embodiments of the present disclosure, the broadcaster sound information refers to broadcaster sound information that does not have a stereo impression.

The stereo sound information refers to a sound that is closer to the nature and has a stereo impression. The listener may perceive the orientation of the sound source relative to the listener according to the stereo sound information.

For example, the viewer enters a certain live broadcast room, there are three pieces of broadcaster position information on the periphery of the viewer position information. The broadcaster avatar of the broadcaster A, the broadcaster avatar of the broadcaster B, and the broadcaster avatar of the broadcaster C, are respectively displayed.

It is obtained that the broadcaster avatar of broadcaster A is from an upper right side of the viewer avatar, the broadcaster avatar of broadcaster B is from a direct upper side of the viewer avatar, and the broadcaster avatar C of broadcaster is from a direct rear side of the viewer avatar.

The broadcaster sound information of the broadcaster A is converted into stereo sound information having a stereo impression from an upper right side according to the obtained three pieces of orientation information. The broadcaster sound of the broadcaster B is converted into stereo sound information having a stereo impression from a direct upper side. The broadcaster sound information of the broadcaster C is converted into stereo sound information having a stereo impression from a direct rear side.

Figure 7:
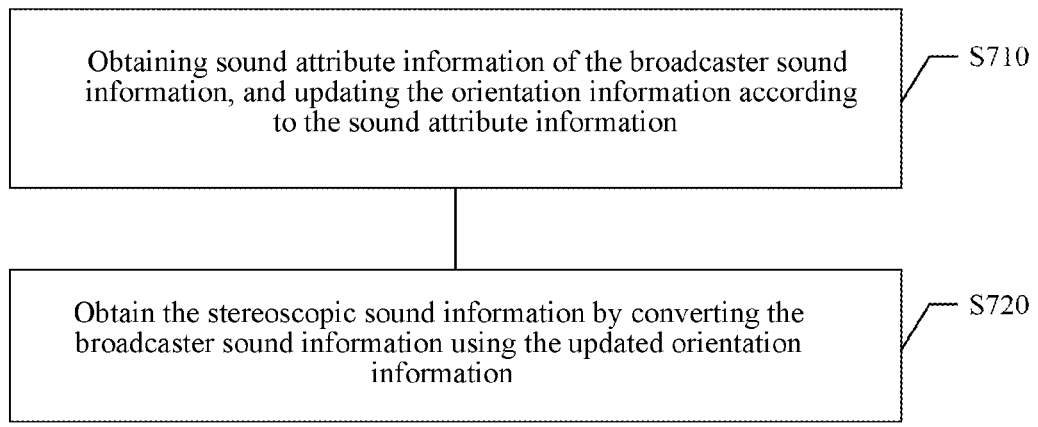
FIG. 7 shows a schematic flowchart of converting broadcaster sound information by using orientation information to obtain stereo sound information according to an embodiment of the present disclosure.

FIG. 7 shows a schematic flowchart of obtaining stereo sound information by converting broadcaster sound information using orientation information. As shown in FIG. 7, the method may also include the following steps: in step S710, sound attribute information of broadcaster sound information is obtained, and orientation information is updated according to the sound attribute information.

Among them, the sound attribute information refers to one piece of information having a relationship with the broadcaster sound information.

The attribute information may be tone information of the broadcaster, may be timbre information of the broadcaster, or may be volume information of the broadcaster, which is not specifically limited in the embodiments.

For example, the viewer enters a certain voice live broadcast room, there are three pieces of broadcaster position information on the periphery of the viewer position information. The broadcaster avatar of the broadcaster A, the broadcaster avatar of the broadcaster B, and the broadcaster avatar of the broadcaster C, are respectively displayed.

Among them, the broadcaster avatar of the broadcaster A is from a direct right side of the viewer avatar, the broadcaster avatar of the broadcaster B is from an upper right side of the viewer avatar, and the broadcaster avatar of the broadcaster C is from a direct upper side of the viewer avatar.

If the obtained broadcaster sound attribute information is the tone information, and the tone information of the A broadcaster is 1000 mel, the tone information of the broadcaster B is 500 mel, and the tone information of the C broadcaster is 1500 mel.

The broadcaster sound with a smaller tone is adjusted near the ear of the viewer, the broadcaster sound with a larger tone is adjusted to a position far away from the ear of the viewer, and the user experience can be improved according to such an adjustment mode.

Based on this, the orientation information of the broadcaster avatar of broadcaster B is updated to be the direct right side of the viewer avatar, the orientation information of the broadcaster avatar of broadcaster B is updated to be the upper right side of the viewer avatar, and the orientation information of the broadcaster avatar of broadcaster C is updated to be the direct upper side of the viewer avatar.

In step S720, stereo sound information is obtained by converting the broadcaster sound information using the updated orientation information.

If the orientation information of the broadcaster avatar relative to the viewer avatar is updated, the updated orientation information is used to adjust the broadcaster sound information to obtain the stereo sound information.

For example, the viewer enters a certain voice live broadcast room, there are three pieces of broadcaster position information on the periphery of the viewer position information. The broadcaster avatar of the broadcaster A, the broadcaster avatar of the broadcaster B, and the broadcaster avatar of the broadcaster C, are respectively displayed.

Among them, the broadcaster avatar of the broadcaster A is from a direct right side of the viewer avatar, the broadcaster avatar of the broadcaster B is from an upper right side of the viewer avatar, and the broadcaster avatar of the broadcaster C is from a direct upper side of the viewer avatar.

If the obtained broadcaster sound attribute information is the tone information, and the tone information of the broadcaster A is 1000 mel, the tone information of the broadcaster B is 500 mel, and the tone information of the broadcaster C is 1500 mel.

The broadcaster sound with a smaller tone is adjusted near the ear of the viewer, the broadcaster sound with a larger tone is adjusted to a position far away from the ear of the viewer, and the user experience can be improved according to such an adjustment mode.

Based on this, the orientation information of the broadcaster avatar of broadcaster B is updated to be the direct right side of the viewer avatar, the orientation information of the broadcaster avatar of broadcaster A is updated to be the upper right side of the viewer avatar, and the orientation information of the broadcaster avatar of broadcaster C is not updated.

According to the updated two pieces of orientation information, the broadcaster sound information of the broadcaster A is converted into stereo sound information having a stereo impression from an upper right side, and the broadcaster sound of the broadcaster B is converted into stereo sound information having a stereo impression from an upper right side.

In the method and apparatus provided in the embodiments of the present disclosure, on one hand, the orientation information of the broadcaster position information relative to the viewer position information is determined on the terminal having the graphical user interface, and the broadcaster sound information is converted into the stereo sound information according to the orientation information, so that the sound has a stereo effect, the reality experience of the user is enhanced, and the user experience is improved. On the other hand, by responding to the second trigger operation and the third trigger operation, the stereo effect of the sound can be flexibly changed, the application scenarios of sound information processing are enriched, and the interestingness of using the method for processing sound information is increased.

The method for processing sound information in the embodiments of the present disclosure is described in detail below in combination with an application scenario.

Figure 8:
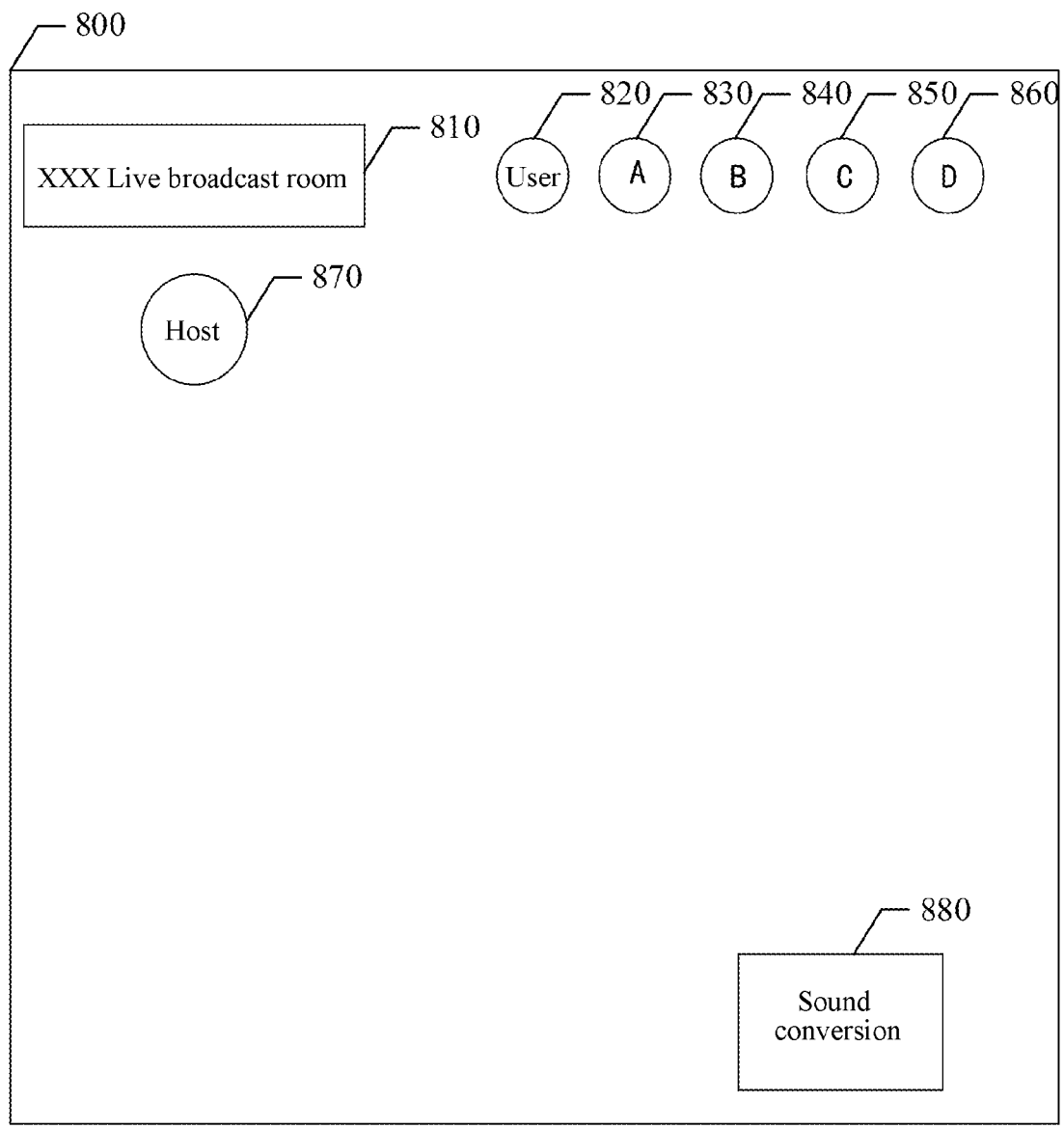
FIG. 8 shows a schematic diagram of a live broadcast interface when a trigger operation is not performed on a sound conversion control in an application scenario according to an embodiment of the present disclosure.

FIG. 8 shows a schematic diagram of a live broadcast interface when a trigger operation is not performed on a sound conversion control in a voice live broadcast scenario. As shown in FIG. 8, where, the interface 800 is a live broadcast interface when the voice conversion control is not triggered, the text 810 is the name of the live broadcast room; the control 820 is a viewer avatar control; the control 830, the control 840, the control 850 and the control 860 are the broadcaster avatar control of the broadcaster A, the broadcaster avatar control of the broadcaster B, the broadcaster avatar control of the broadcaster C, and the broadcaster avatar control of the broadcaster D, respectively; the control 870 is a host avatar control for maintaining the order of the live broadcast room; and the control 880 is a sound conversion control.

When the viewer does not trigger the sound conversion control, the sound conversion function is not turned on. At this time, the broadcaster sound information corresponding to the A broadcaster avatar, the broadcaster sound information corresponding to the B broadcaster avatar, the broadcaster sound information corresponding to the C broadcaster avatar, and the broadcaster sound information corresponding to the D broadcaster avatar can be heard. It should be noted that the broadcaster sound information received by the viewer at this time is sound information that does not have a stereo impression.

Figure 9:
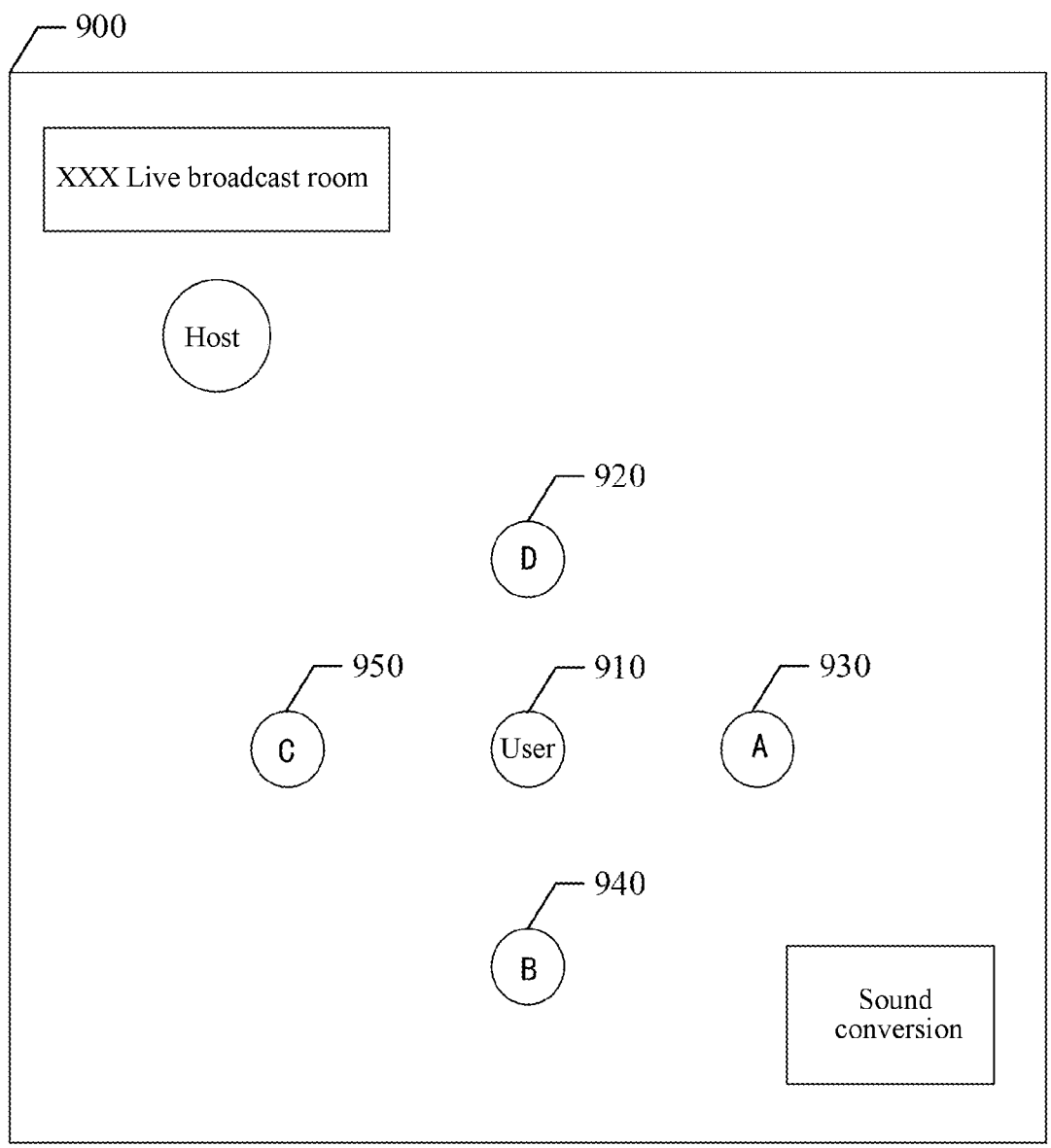
FIG. 9 shows a schematic diagram of a live broadcast interface after a sound conversion control is triggered in an application scenario according to an embodiment of the present disclosure.

FIG. 9 shows a schematic diagram of a live broadcast interface after triggering a sound conversion control in a voice live broadcast scenario. As shown in FIG. 9, the interface 900 is a live broadcast interface after triggering a sound conversion control; the control 910 is an viewer avatar control, the control 920, the control 930, the control

940, and the control 950 are a broadcaster avatar control of the broadcaster A, a broadcaster avatar control of the broadcaster B, a broadcaster avatar control of the broadcaster C, and a broadcaster avatar control of the broadcaster, respectively; and the track 960 is a position track that can be displayed for the broadcaster avatar.

Obviously, in FIG. 9, the display position of the viewer control and the broadcaster control in the live broadcast interface changes.

When the viewer triggers the sound conversion control in the live broadcast interface, firstly, a position in the user interface is determined as the viewer position information of the viewer avatar, for example, the position with a coordinate of (50, 50) in the interface 900, and then the broadcaster avatar is displayed on the periphery of the viewer avatar.

It should be noted that, if there is one broadcaster, the broadcaster position information of the broadcaster avatar corresponding to the broadcaster may be any place on the periphery of the viewer position information.

If there is more than one broadcaster, it is necessary to determine more than one position on the periphery of the viewer position information as broadcaster position information of the more than one broadcaster avatar.

For example, in FIG. 9, firstly, a display track capable of displaying a broadcaster avatar is determined on the periphery of the viewer avatar, and then it is obtained that the number of the broadcasters is four. By taking the intersection point between the direct right side of the broadcaster and the display track as the starting point, four positions for displaying the broadcaster avatar can be determined uniformly at intervals, and are respectively from a direct upper side of the viewer avatar, from a direct right side of the viewer avatar, from a direct lower side of the viewer avatar and from a direct left side of the viewer avatar.

Then, the broadcaster level information of the four broadcasters is obtained. Among them, the broadcaster level information of the broadcaster A is greater than the broadcaster level information of the broadcaster C, the broadcaster level information of the broadcaster C is greater than the broadcaster level information of the broadcaster D, and the broadcaster level information of the broadcaster D is greater than the broadcaster level information of the broadcaster B.

Due to the best listening effect of the position from the direct right side of the viewer avatar and the position from the direct left side of the viewer avatar, the listening effect from the direct upper side of the viewer avatar and from the direct lower side of the viewer avatar is relatively poor. Therefore, the A broadcaster avatar is displayed from the direct right side of the viewer avatar, the C broadcaster avatar is displayed from the direct left side of the viewer avatar, the D broadcaster avatar is displayed from the direct upper side of the viewer avatar, and the B broadcaster avatar is displayed from the direct lower side of the viewer avatar.

In this case, the obtained viewer position information is the position information of the viewer avatar center point (50, 50), and the obtained broadcaster position information is respectively the position information of the A broadcaster avatar center point (70, 50), the position information of the B broadcaster avatar center point (50, 30), the position information of the C broadcaster avatar center point (30, 50), and the position information of the D broadcaster avatar center point (50, 70).

The broadcaster abscissa 50 is compared with the viewer abscissas 70, 50, 30, 50 to obtain an abscissa comparison result, and the broadcaster ordinate 50 is compared with the viewer ordinates 50, 30, 50, 70 to obtain an ordinate comparison result.

Based on this, it can be obtained four pieces of orientation information that the A broadcaster avatar is from a direct right side of the viewer avatar, the B broadcaster avatar is from a direct lower side of the viewer avatar, the C broadcaster avatar is from a direct left side of the viewer avatar and the D broadcaster avatar is from a direct upper side of the viewer avatar.

Based on the orientation information, the sound information of the broadcaster A is converted into stereo sound information having a stereo impression from a direct right side, the sound information of the broadcaster B is converted into stereo sound information having a stereo impression from a direct lower side, the sound information of the broadcaster C is converted into stereo sound information having a stereo impression from a direct left side, and the sound information of the broadcaster D is converted into stereo sound information having a stereo impression from a direct upper side.

Figure 10:
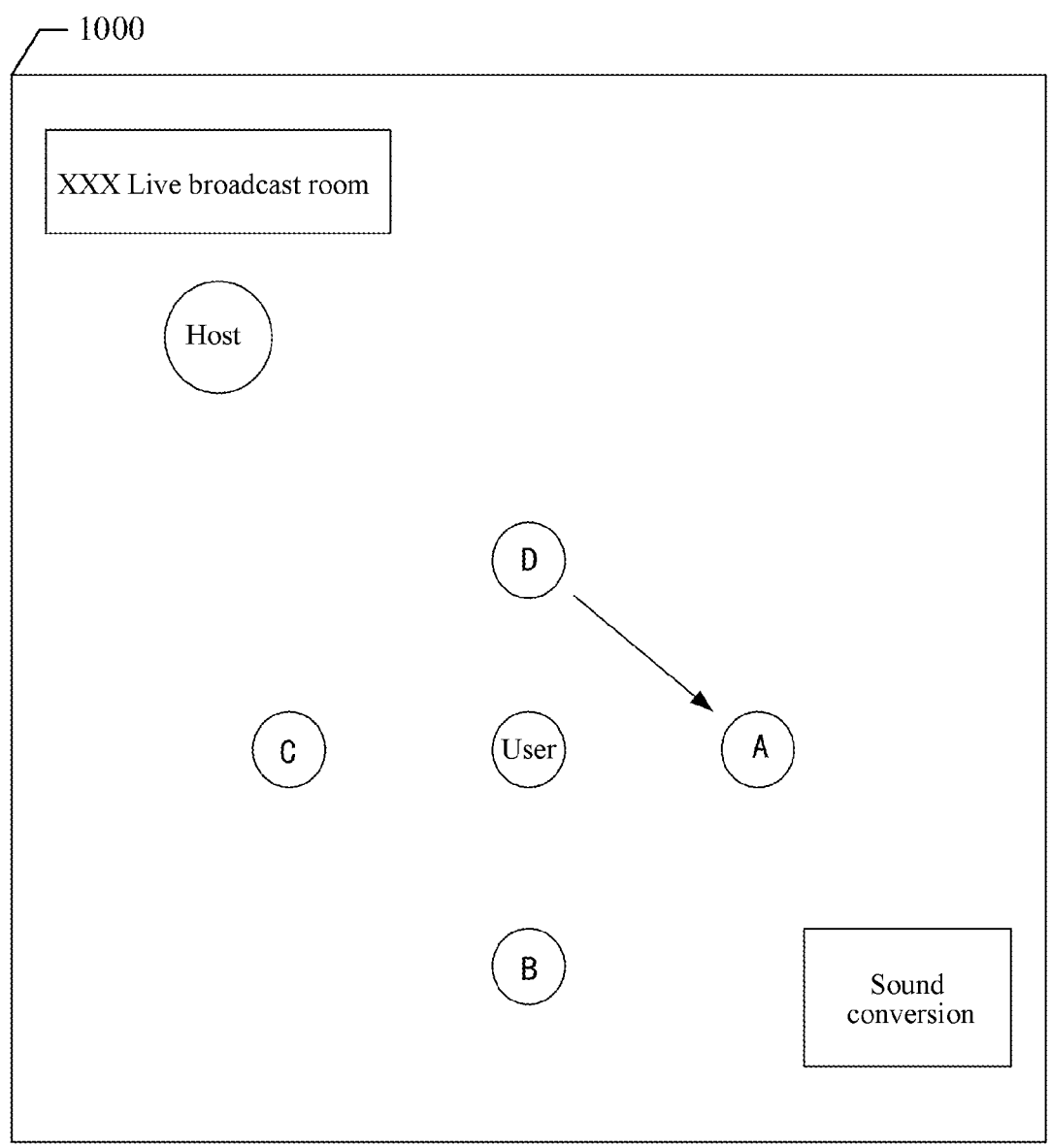
FIG. 10 shows a schematic diagram of a live broadcast interface of a viewer sliding a broadcaster identifier control in an application scenario according to an embodiment of the present disclosure.

FIG. 10 is a schematic diagram of a live broadcast interface during a viewer sliding broadcaster identifier control, where the interface 1000 is a live broadcast interface during the process of sliding a broadcaster control by a viewer.

At this time, the user slides the avatar of the broadcaster D to the avatar of the broadcaster A through the sliding behavior. And, the broadcaster position information is adjusted in response to the sliding trigger operation.

There are two possible results after adjustment. In the first result, the user slides the D broadcaster avatar to the A broadcaster avatar through the sliding behavior. The broadcaster level of the broadcaster D is compared with the broadcaster level of the broadcaster A. If the broadcaster level of the broadcaster D is greater than the broadcaster level of the broadcaster A, the D broadcaster avatar is covered on the A broadcaster avatar and displayed from a direct right side of the viewer avatar; and if the broadcaster level of the broadcaster A is greater than the broadcaster level of the broadcaster D, the A broadcaster avatar is covered on the D broadcaster avatar and displayed from a direct right side of the viewer avatar.

Moreover, the broadcaster position information of the broadcaster D is adjusted to be (70, 50). Then, the sound information with the stereo impression from a direct upper side of the broadcaster D is converted into the sound information with the stereo impression from a direct right side according to the orientation information of the D broadcaster avatar being equivalent to the viewer avatar.

In the second result, the user slides the D broadcaster avatar to the A broadcaster avatar through the sliding behavior. At this time, the broadcaster position information of the D broadcaster avatar and the broadcaster position information of the A broadcaster avatar are exchanged, the exchanged broadcaster position information of the broadcaster D is (70, 50), and the exchanged broadcaster position information of the broadcaster A is (50, 70).

Based on this, the sound information with the stereo impression from a direct upper side of the broadcaster D is converted into the sound information with the stereo impression from a direct right side according to the orientation information of D broadcaster avatar being equivalent to the viewer avatar, and the sound information with the stereo impression from a direct right side of the broadcaster A is converted into the sound information with the stereo impression from a direct upper side according to the orientation information of the A broadcaster avatar being equivalent to the viewer avatar.

In addition, after the sound conversion control is triggered, the position information of the broadcaster may be adjusted according to the tone information of the broadcaster A, the broadcaster B, the broadcaster C, and the broadcaster D.

For example, the tone information of the broadcaster A is 1000 mel, the tone information of the broadcaster B is 500 mel, the tone information of the broadcaster C is 1500 mel, and the tone information of the broadcaster D is 2000 mel.

The broadcaster sound with a smaller tone is adjusted near the ear of the viewer, and the broadcaster sound with a larger tone is adjusted to a position far away from the ear of the viewer, so that the user experience can be improved.

Based on this, the orientation information of the B broadcaster avatar is updated to be the direct right side of the viewer avatar, the orientation information of the A broadcaster avatar is updated to be the direct left side of the viewer avatar, the orientation information of the C broadcaster avatar is updated to be the direct upper side of the viewer avatar, and the orientation information of the D broadcaster avatar is updated to be the direct rear side of the viewer avatar.

In the present application scenario, on one hand, the orientation information of the broadcaster position information relative to the viewer position information is determined on the live broadcast interface, and the broadcaster sound information is converted into the stereo sound information according to the orientation information, so that the broadcaster sound has a stereo effect, the reality experience of the viewer is enhanced, and the experience degree of the viewer is improved. On the other hand, by responding to the trigger operation acting on the broadcaster avatar, the stereo effect of the broadcaster sound can be flexibly changed, the application scenarios of sound information processing are enriched, and the interestingness of using the method for processing sound information is increased.

Figure 11:
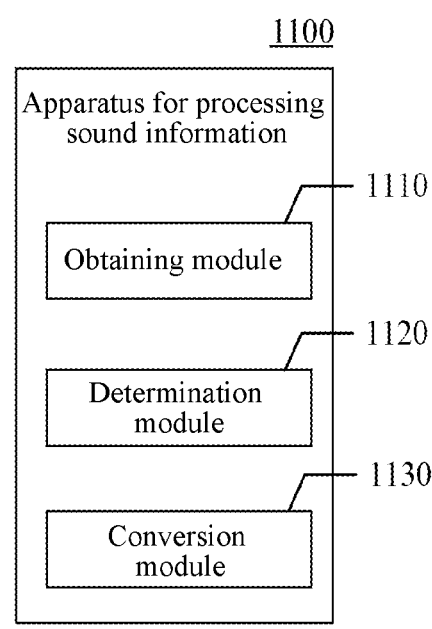
FIG. 11 shows a schematic structural diagram of an apparatus for processing sound information according to an embodiment of the present disclosure.

In addition, in some embodiments of the present disclosure, there is further provided an apparatus for processing sound information. FIG. 11 shows a schematic structural diagram of an apparatus for processing sound information. As shown in FIG. 11, the apparatus for processing sound information 1100 may include: an obtaining module 1110, a determination module 1120, and a conversion module 1130.

The obtaining module 1110 is configured to obtain viewer position information of a viewer identifier in a graphical user interface, and obtain broadcaster position information of a broadcaster identifier in the graphical user interface.

The determining module 1120 is configured to determine orientation information of the broadcaster identifier relative to the viewer identifier according to the viewer position information and the broadcaster position information; and the conversion module 1130 is configured to obtain broadcaster sound information corresponding to the broadcaster identifier, and obtain stereo sound information by converting the broadcaster sound information using the orientation information.

The specific details of the apparatus for processing sound information 1100 have been described in detail in the corresponding method for processing sound information, and therefore, details are not described here again.

It should be noted that although several modules or units of the apparatus for processing sound information 1100 are mentioned in the above detailed description, such partitioning is not mandatory. Indeed, according to embodiments of the present disclosure, the features and functions of the two or more modules or units described above may be embodied in one module or unit. Conversely, the features and functions of one module or unit described above may be further divided into more than one module or unit for materialization.

In addition, in some embodiments of the present disclosure, there is further provided an electronic device capable of implementing the above method.

The electronic device 1200 according to the embodiment of the present disclosure will be described below with reference to FIG. 12. The electronic device 1200 shown in FIG. 12 is an example, and should not impose any restrictions on the function and scope of use of the embodiments of the present disclosure.

Figure 12:
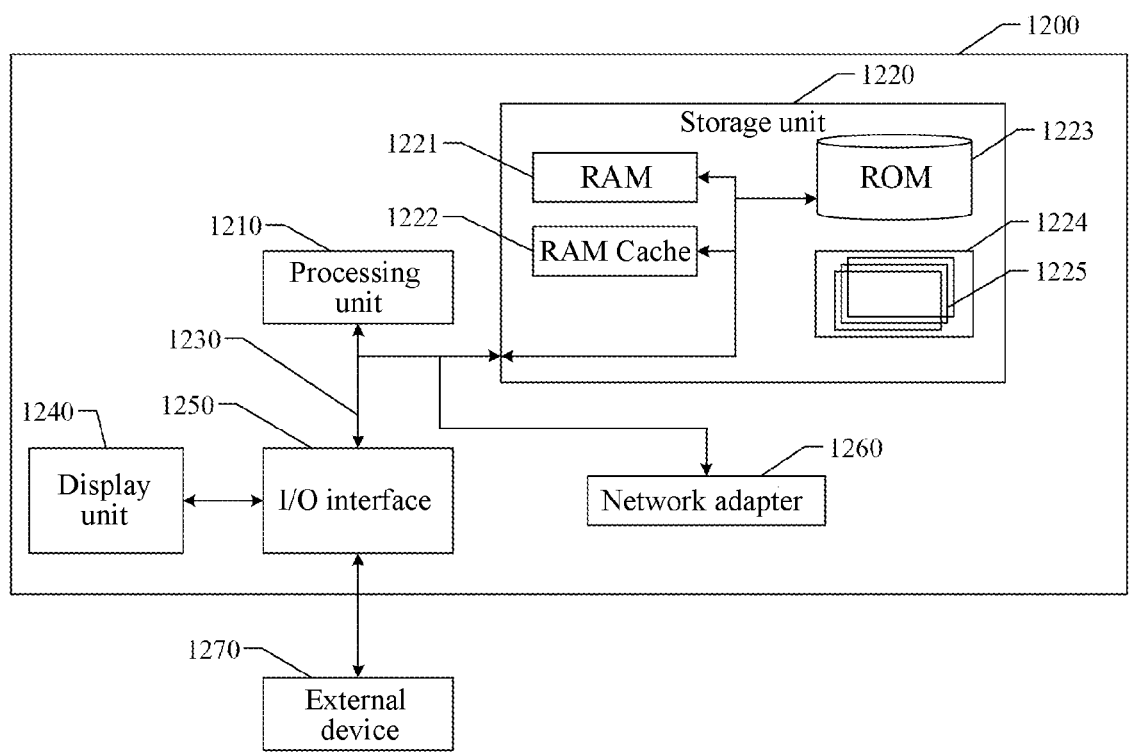
FIG. 12 shows an electronic device for a method for processing sound information according to an embodiment of the present disclosure.

As shown in FIG. 12, the electronic device 1200 is represented in the form of a general-purpose computing device. The components of the electronic device 1200 may include, but are not limited to: the at least one processing unit 1210, the at least one storage unit 1220, a bus 1230 connecting different system components (including the storage unit 1220 and the processing unit 1910), and a display unit 1240.

Among them, the storage unit stores with a program code, and the program code may be executed by the processing unit 1210, so that the processing unit 1210 executes the steps described in the foregoing "exemplary method" portion of the description according to various exemplary embodiments of the present disclosure.

The storage unit 1220 may include a readable medium in the form of a volatile storage unit, for example, a random access storage unit (RAM) 1221 and/or a RAM Cache storage unit 1222, and may further include a read-only storage unit (ROM) 1223.

The storage unit 1220 may further include a program/use tool 1224 having a set of (at least one) program module 1225, such program module 1225 including but not limited to: an operating system, one or more applications, other program modules, and program data, each of these examples or some combination of which may include reality of a network environment.

The bus 1230 may be one or more of several types of bus structures, including a memory cell bus or a memory cell controller, a peripheral bus, a graphics acceleration port, a processing unit, or a local bus using any of a plurality of bus structures.

The electronic device 1200 may also communicate with one or more external devices 1270 (e.g., a keyboard, a pointing device, a Bluetooth device, etc.), may also communicate with one or more devices that enable a user to interact with the electronic device 1200, and/or any device (e.g., router, modem, etc.) that enables the electronic device 1200 to communicate with one or more other computing devices. Such communication may be performed by an input/output (I/O) interface 1250. Moreover, the electronic device 1200 may also communicate with one or more networks (e.g., a local area network (LAN), a wide area network (WAN), and/or a public network, such as the Internet) through the network adapter 1260. As shown, network adapter 1260 communicates with other modules of electronic device 1200 through bus 1230. It should be understood that although not shown in the drawings, other hardware and/or software modules may be used in conjunction with electronic device 1200, including but not limited to: microcode, a device driver, a redundant processing unit, an external disk drive array, a RAID system, a tape driver, and a data backup storage system, etc.

Through the description of the above embodiments, a person skilled in the art would easily understand that the example embodiments described here may be implemented by software, or may be implemented by software in combination with necessary hardware. Therefore, the technical solutions according to the embodiments of the present disclosure may be embodied in the form of a software product, and the software product may be stored in a non-volatile storage medium (which may be a CD-ROM, a USB flash disk, a mobile hard disk, etc.) or on a network, including several instructions to enable a computing device (which may be a personal computer, a server, a terminal device, or a network device, etc.) to perform the method according to the embodiments of the present disclosure.

In some embodiments of the present disclosure, there is further provided a non-transitory computer-readable storage medium, and a program product capable of implementing the method described in the description is stored on the computer-readable storage medium. In some possible embodiments, various aspects of the present disclosure may also be implemented in the form of a program product, which includes a program code, and when the program product runs on a terminal device, the program code is used to enable the terminal device to perform the steps of the various exemplary embodiments of the present disclosure described in the foregoing "exemplary method" portion of the present description.

Figure 13:
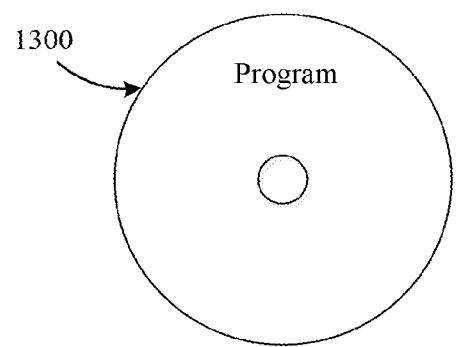
FIG. 13 shows a computer-readable storage medium for a method for processing sound information according to an embodiment of the present disclosure.

Referring to FIG. 13, a program product 1300 for implementing the above method is described according to an embodiment of the present disclosure, which may employ a portable compact disk read-only memory (CD-ROM) and includes program code and may run on a terminal device, such as a personal computer. However, the program product of the present disclosure is not limited to this, and in the context, the readable storage medium may be any tangible medium including or storing with a program, and the program may be used by or combined with an instruction execution system, an apparatus, or a device.

The program product may employ any combination of one or more readable medium. The readable medium may be a readable signal medium or a readable storage medium. The readable storage medium may be, for example, but not limited to, an electrical, magnetic, optical, electromagnetic, infrared, or semiconductor system, apparatus, or device, or any combination of them. More specific examples of readable storage medium (non-exhaustive lists) include an electrical connection with one or more wires, a portable disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of them.

The computer-readable signal medium may include a data signal that is propagated in a baseband or as part of a carrier, where a readable program code is carried. Such a propagated data signal may take a variety of forms, including, but not limited to, an electromagnetic signal, an optical signal, or any suitable combination of them. The readable signal medium may also be any readable medium other than the readable storage medium, and the readable medium may send, propagate, or transmit a program for use by or in connection with an instruction execution system, apparatus, or device.

The program code included on the readable medium may be transmitted by any suitable medium, including but not limited to wireless, wired, optical cable, RF, etc., or any suitable combination of the foregoing.

Program code for performing the operations of the present disclosure may be written in any combination of one or more programming languages, including object-oriented programming languages, such as Java, C++, etc., also including conventional procedural programming languages, such as "C" languages or similar programming languages. The program code may be executed entirely on the user computing device, partly on the user device, as a stand-alone software package, partly on the user computing device, partly on the remote computing device, or entirely on the remote computing device or server. In situations involving a remote computing device, a remote computing device may be connected to a user computing device through any type of network, including a local area network (LAN) or a wide area network (WAN), or may be connected to an external computing device (e.g., to connect via the Internet using an Internet Service Provider).

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Other embodiments of the present disclosure will be apparent to those skilled in the art after consideration of the description and practice of the disclosure disclosed here. This application is intended to cover any variations, uses, or adaptations of the present disclosure following the general principles of the present disclosure and including common general knowledge or customary technical means in the art not disclosed in the present disclosure. It is intended that the description and examples be considered as examples, with a true scope and spirit of the disclosure being indicated by the claims.

What is claimed is:

1. A method for processing sound information, comprising:
   obtaining, by a terminal comprising a graphical user interface, viewer position information of a viewer identifier in the graphical user interface and broadcaster position information of a broadcaster identifier in the graphical user interface;
   determining, by the terminal, orientation information of the broadcaster identifier relative to the viewer identifier according to the viewer position information and the broadcaster position information; wherein determining the orientation information of the broadcaster identifier relative to the viewer identifier according to the viewer position information and the broadcaster position information comprises: determining, in response to identifying a plurality pieces of broadcaster position information, that a plurality of broadcaster identifiers exist in the graphic user interface; and displaying the plurality of broadcaster identifiers on periphery of the viewer identifier, and determining the orientation information of the plurality of broadcaster identifiers relative to the viewer identifier according to the viewer position information and the broadcaster position information; and wherein displaying the plurality of broadcaster identifiers on the periphery of the viewer identifier comprises: obtaining a plurality pieces of priority information corresponding to the plurality of broadcaster identifiers, and obtaining an information comparison result by comparing the plurality pieces of priority information; and displaying the plurality of broadcaster identifiers on the periphery of the viewer identifier according to the information comparison result; and obtaining, by the terminal, broadcaster sound information corresponding to the broadcaster identifier, and obtaining stereo sound information by converting the broadcaster sound information based on the orientation information.

2. The method for processing sound information according to claim 1, wherein obtaining the viewer position information of the viewer identifier in the graphical user interface and the broadcaster position information of the broadcaster identifier in the graphical user interface comprises:

providing a sound conversion control on the graphical user interface; and obtaining, in response to a first trigger operation acting on the sound conversion control, the viewer position information of the viewer identifier in the graphical user interface and the broadcaster position information of the broadcaster identifier in the graphical user interface.

3. The method for processing sound information according to claim 1, wherein the plurality pieces of priority information corresponding to the plurality of broadcaster identifiers comprise: broadcaster level information corresponding to the plurality of broadcaster identifiers, historical number of viewers corresponding to the plurality of broadcaster identifiers, and broadcaster rewarding degree information corresponding to the plurality of broadcaster identifiers.

4. The method for processing sound information according to claim 1, wherein determining the orientation information of the broadcaster identifier relative to the viewer identifier according to the viewer position information and the broadcaster position information comprises:

adjusting, in response to a second trigger operation acting on the broadcaster identifier, the broadcaster position information; and determining the orientation information of the broadcaster identifier relative to the viewer identifier according to the viewer position information and the broadcaster position information.

5. The method for processing sound information according to claim 1, wherein determining the orientation information of the broadcaster identifier relative to the viewer identifier according to the viewer position information and the broadcaster position information comprises:

adjusting, in response to a third trigger operation acting on the viewer identifier, the viewer position information; and determining the orientation information of the broadcaster identifier relative to the viewer identifier according to the viewer position information and the broadcaster position information.

6. The method for processing sound information according to claim 1, wherein obtaining the stereo sound information by converting the broadcaster sound information based on the orientation information comprises:

obtaining sound attribute information of the broadcaster sound information, and updating the orientation information according to the sound attribute information; and obtaining the stereo sound information by converting the broadcaster sound information based on updated orientation information.

7. The method for processing sound information according to claim 6, wherein the sound attribute information comprises: tone information of the broadcaster sound information, timbre information of the broadcaster sound information, and volume information of the broadcaster sound information.

8. The method for processing sound information according to claim 6, wherein updating the orientation information according to the sound attribute information comprises:

adjusting the broadcaster position information in the graphical user interface based on the sound attribute information; and updating the orientation information of the broadcaster identifier relative to the viewer identifier based on adjusted broadcaster position information.

9. The method for processing sound information according to claim 1, wherein obtaining the viewer position information of the viewer identifier in the graphical user interface and the broadcaster position information of the broadcaster identifier in the graphical user interface comprises:

obtaining an abscissa of the viewer identifier and an ordinate of the viewer identifier in the graphical user interface; and obtaining an abscissa of the broadcaster identifier and an ordinate of the broadcaster identifier in the graphical user interface, wherein the viewer position information and the broadcaster position information are relative to a same point in the graphical user interface.

10. The method for processing sound information according to claim 1, wherein the viewer identifier comprises: a viewer avatar, a viewer nickname, and a viewer identity identification number.

11. The method for processing sound information according to claim 1, wherein the broadcaster identifier comprises: a broadcaster avatar, a broadcaster nickname, and a broadcaster identity identification number.

12. An electronic device, comprising:
a processor;
a memory, configured to store an executable instruction by the processor;
wherein the processor is configured to execute a method for processing sound information by executing the executable instruction, the method comprising:
obtaining viewer position information of a viewer identifier in a graphical user interface of the electronic device and broadcaster position information of a broadcaster identifier in the graphical user interface;
determining orientation information of the broadcaster identifier relative to the viewer identifier according to the viewer position information and the broadcaster position information; wherein determining the orientation information of the broadcaster identifier relative to the viewer identifier according to the viewer position information and the broadcaster position information comprises: determining, in response to identifying a plurality pieces of broadcaster position information, that a plurality of broadcaster identifiers exist in the graphic user interface; and displaying the plurality of broadcaster identifiers on periphery of the viewer identifier, and determining the orientation information of the plurality of broadcaster identifiers relative to the viewer identifier according to the viewer position information and the broadcaster position information; and wherein displaying the plurality of broadcaster identifiers on the periphery of the viewer identifier comprises: obtaining a plurality pieces of priority information corresponding to the plurality of broadcaster identifiers, and obtaining an information comparison result by comparing the plurality pieces of priority information; and displaying the plurality of broadcaster identifiers on the periphery of the viewer identifier according to the information comparison result; and obtaining broadcaster sound information corresponding to the broadcaster identifier, and obtaining stereo sound information by converting the broadcaster sound information based on the orientation information.

13. The electronic device according to claim 12, wherein determining the orientation information of the broadcaster identifier relative to the viewer identifier according to the viewer position information and the broadcaster position information comprises:

determining, in response to identifying a plurality pieces of broadcaster position information, that a plurality of broadcaster identifiers exist in the graphic user interface; and displaying the plurality of broadcaster identifiers on periphery of the viewer identifier, and determining the orientation information of the plurality of broadcaster identifiers relative to the viewer identifier according to the viewer position information and the broadcaster position information.

14. The electronic device according to claim 13, wherein displaying the plurality of broadcaster identifiers on the periphery of the viewer identifier comprises:

obtaining a plurality pieces of priority information corresponding to the plurality of broadcaster identifiers, and obtaining an information comparison result by comparing the plurality pieces of priority information; and displaying the plurality of broadcaster identifiers on the periphery of the viewer identifier according to the information comparison result.

15. The electronic device according to claim 12, wherein determining the orientation information of the broadcaster identifier relative to the viewer identifier according to the viewer position information and the broadcaster position information comprises:

adjusting, in response to a second trigger operation acting on the broadcaster identifier, the broadcaster position information; and determining the orientation information of the broadcaster identifier relative to the viewer identifier according to the viewer position information and the broadcaster position information.

16. The electronic device according to claim 12, wherein obtaining the stereo sound information by converting the broadcaster sound information based on the orientation information comprises:

obtaining sound attribute information of the broadcaster sound information, and updating the orientation information according to the sound attribute information; and obtaining the stereo sound information by converting the broadcaster sound information based on updated orientation information.

17. A non-transitory computer-readable storage medium having stored thereon instruction that, when executed by a processor of an electronic device, cause the electronic device to perform operations of a method for processing sound information, the method comprising:

obtaining viewer position information of a viewer identifier in a graphical user interface of the electronic device and broadcaster position information of a broadcaster identifier in the graphical user interface;

determining orientation information of the broadcaster identifier relative to the viewer identifier according to the viewer position information and the broadcaster position information; wherein determining the orientation information of the broadcaster identifier relative to the viewer identifier according to the viewer position information and the broadcaster position information comprises: determining, in response to identifying a plurality pieces of broadcaster position information, that a plurality of broadcaster identifiers exist in the graphic user interface; and displaying the plurality of broadcaster identifiers on periphery of the viewer identifier, and determining the orientation information of the plurality of broadcaster identifiers relative to the viewer identifier according to the viewer position information and the broadcaster position information; and wherein displaying the plurality of broadcaster identifiers on the periphery of the viewer identifier comprises: obtaining a plurality pieces of priority information corresponding to the plurality of broadcaster identifiers, and obtaining an information comparison result by comparing the plurality pieces of priority information; and displaying the plurality of broadcaster identifiers on the periphery of the viewer identifier according to the information comparison result; and obtaining broadcaster sound information corresponding to the broadcaster identifier, and obtaining stereo sound information by converting the broadcaster sound information based on the orientation information.

18. The non-transitory computer-readable storage medium according to claim 17, wherein obtaining the stereo sound information by converting the broadcaster sound information based on the orientation information comprises:

obtaining sound attribute information of the broadcaster sound information, and updating the orientation information according to the sound attribute information; and obtaining the stereo sound information by converting the broadcaster sound information based on updated orientation information.

* * * * *